United States Patent
Nose et al.

(10) Patent No.: US 10,780,574 B2
(45) Date of Patent: Sep. 22, 2020

(54) LINK ACTUATING DEVICE

(71) Applicant: NTN CORPORATION, Osaka (JP)

(72) Inventors: Kenzou Nose, Iwata (JP); Hiroshi Isobe, Iwata (JP); Seigo Sakata, Iwata (JP)

(73) Assignee: NTN CORPORATION, Osaka (JP)

(*) Notice: Subject to any disclaimer, the term of this patent is extended or adjusted under 35 U.S.C. 154(b) by 109 days.

(21) Appl. No.: 16/008,581

(22) Filed: Jun. 14, 2018

(65) Prior Publication Data

US 2018/0290294 A1 Oct. 11, 2018

Related U.S. Application Data

(63) Continuation of application No. PCT/JP2016/087773, filed on Dec. 19, 2016.

(30) Foreign Application Priority Data

Dec. 24, 2015 (JP) .............................. 2015-250939

(51) Int. Cl.
*B25J 9/00* (2006.01)
*F16H 21/48* (2006.01)
(Continued)

(52) U.S. Cl.
CPC ........... *B25J 9/0048* (2013.01); *B25J 9/0009* (2013.01); *B25J 9/102* (2013.01); *B25J 9/108* (2013.01);
(Continued)

(58) Field of Classification Search
CPC ........ B25J 9/0048; B25J 9/0009; B25J 9/102; B25J 9/108; B25J 9/08; F16H 21/48; F16H 21/50
See application file for complete search history.

(56) References Cited

U.S. PATENT DOCUMENTS

| 5,893,296 A | 4/1999 | Rosheim |
| 7,472,622 B2 | 1/2009 | Isobe et al. |
| (Continued) | | |

FOREIGN PATENT DOCUMENTS

| CN | 103827547 A | 5/2014 |
| CN | 104024694 A | 9/2014 |
| (Continued) | | |

OTHER PUBLICATIONS

International Search Report dated Mar. 21, 2017 in corresponding International Patent Application No. PCT/JP2016/087773.
(Continued)

*Primary Examiner* — Vicky A Johnson

(57) ABSTRACT

A distal end side link hub is coupled to a proximal end side link hub via three or more link mechanisms. Each link mechanism has a proximal side end link member, a distal side end link member, and an intermediate link member. The proximal side end link member has a bent portion and rotation shaft mounting portions. A rotation shaft is mounted to the rotation shaft mounting portion. A bevel gear, forming a part of a gear mechanism for transmitting rotary motion of a posture control actuator to the proximal side end link member, is mounted on the rotation shaft mounting portion and disposed in a space between two virtual planes obtained by extending a radially inner edge and a radially outer edge of one end of the bent portion in a longitudinal direction of the rotation shaft mounting portion.

7 Claims, 13 Drawing Sheets

(51) Int. Cl.
    *B25J 9/10*         (2006.01)
    *B25J 11/00*       (2006.01)
    *F16H 21/50*      (2006.01)
    *B25J 9/08*         (2006.01)

(52) U.S. Cl.
    CPC .............. *B25J 11/00* (2013.01); *F16H 21/48* (2013.01); *F16H 21/50* (2013.01); *B25J 9/08* (2013.01)

(56) References Cited

U.S. PATENT DOCUMENTS

| | | |
|---|---|---|
| 9,243,696 B2 | 1/2016 | Isobe et al. |
| 10,022,827 B2 | 7/2018 | Isobe et al. |
| 2005/0159075 A1* | 7/2005 | Isobe ................... B25J 17/0266 446/104 |
| 2011/0113915 A1 | 5/2011 | Zhang et al. |
| 2014/0223722 A1 | 8/2014 | Isobe et al. |
| 2014/0224046 A1 | 8/2014 | Isobe et al. |
| 2017/0014994 A1 | 1/2017 | Isobe et al. |
| 2018/0236668 A1* | 8/2018 | Uemura .................... G05D 1/08 |
| 2018/0290294 A1* | 10/2018 | Nose ....................... B25J 9/0009 |
| 2019/0099878 A1* | 4/2019 | Marui .................... B25J 9/0048 |

FOREIGN PATENT DOCUMENTS

| | | |
|---|---|---|
| EP | 0 987 087 A2 | 3/2000 |
| JP | 8-216072 | 8/1996 |
| JP | 2000-94245 | 4/2000 |
| JP | 2004-9276 | 1/2004 |
| JP | 2005-127475 | 5/2005 |
| JP | 2005-144627 | 6/2005 |
| JP | 2010-69580 | 4/2010 |
| JP | 2015-194207 | 11/2015 |
| WO | WO 2015/151898 A1 | 10/2015 |

OTHER PUBLICATIONS

English Translation by WIPO of the International Preliminary Report on Patentability dated Jul. 5, 2018, in corresponding International Patent Application No. PCT/JP2016/087773, pp. 6.

Extended European Search Report dated Jul. 11, 2019 in corresponding European Patent Application No. 16878628.3.

English Translation of Japanese Decision of Grant dated Nov. 28, 2017 in corresponding Japanese Patent Application No. 2015-250939 (2 pp.).

Office Action, dated Jul. 3, 2020, in corresponding Chinese Application No. 201680075622.8 (15 pp.).

* cited by examiner ion No. 2015-250939, filed Dec. 24, 2015, the entire disclosure of which is herein incorporated by reference as a part of this application.

LINK ACTUATING DEVICE

CROSS REFERENCE TO THE RELATED APPLICATION

This application is a continuation application, under 35 U.S.C. § 111(a) of international patent application No. PCT/JP2016/087773, filed Dec. 19, 2016, which claims priority to Japanese patent application No. 2015-250939, filed Dec. 24, 2015, the entire disclosure of which is herein incorporated by reference as a part of this application.

BACKGROUND OF THE INVENTION

Field of the Invention

The present invention relates to a link actuating device for use in equipment, such as medical equipment and industrial equipment, which requires high-speed, high-accuracy, and wide operating range.

Description of Related Art

Parallel link mechanisms for use in various types of work apparatuses such as medical equipment and industrial equipment are disclosed in Patent Documents 1 and 2.

RELATED DOCUMENT

Patent Document

[Patent Document 1] JP Laid-open Patent Publication No. 2000-094245
[Patent Document 2] U.S. Pat. No. 5,893,296

The parallel link mechanism of Patent Document 1 has a comparatively simple configuration, but the operating angle of each link is small. Thus, there is a problem in that if the operating range of a travelling plate is set to be large, the link length is increased, thus resulting in large dimensions for the entire mechanism, which leads to an increase in the size of the apparatus. There is also a problem in that the rigidity of the entire mechanism is low, and thus the weight of a tool to be mounted on the travelling plate, that is, the weight capacity of the travelling plate, is limited to a small value.

The parallel link mechanism of Patent Document 2 is configured such that a distal end side link hub is coupled to a proximal end side link hub via three or more quadric chain link mechanisms such that the posture of the distal end side link hub relative to the proximal end side link hub can be changed. Accordingly, the parallel link mechanism is compact in size but can operate at high speed with high accuracy in a wide operating range.

However, in the case where the parallel link mechanism of Patent Document 2 is used, a link actuating device in combination with a posture control motor, a speed reduction mechanism and the like, the motor and the speed reduction mechanism are disposed radially outward of the parallel link mechanism, and thus there is a problem in that the size of the link actuating device becomes large. In addition, there is also a problem in that the speed reduction mechanism or the motor interferes with the link mechanism, whereby the operating range is limited.

SUMMARY OF THE INVENTION

An object of the present invention is to provide a link actuating device that can operate at high speed with high accuracy in a wide operating range, that is compact in a radial direction thereof, and that allows a posture control actuator to be mounted without limiting the operating range.

A link actuating device of the present invention includes: a proximal end side link hub; a distal end side link hub; three or more link mechanisms which couples the distal end side link hub to the proximal end side link hub such that a posture of the distal end side link hub can be changed relative to the proximal end side link hub; and a posture control actuator configured to arbitrarily change the posture of the distal end side link hub relative to the proximal end side link hub. Each of the link mechanisms includes: a proximal side end link member having one end rotatably coupled to the proximal end side link hub; a distal side end link member having one end rotatably coupled to the distal end side link hub; and an intermediate link member having opposite ends rotatably coupled to other ends of the proximal side and distal side end link members, respectively, and the posture control actuator is provided to each of two or more link mechanisms of the three or more link mechanisms.

In the link actuating device, the proximal side end link member has a bent portion that is bent at an arbitrary angle and a rotation shaft mounting portion that is fixed to one end of the bent portion and to which a rotation shaft located at an axis of a revolute pair between the proximal end side link hub and the proximal side end link member is mounted, and at least a part of a gear mechanism configured to transmit rotary motion by the posture control actuator to the proximal side end link member is mounted on the rotation shaft mounting portion and disposed in a space between two virtual planes obtained by extending a radially inner edge and a radially outer edge of the one end of the bent portion in a longitudinal direction of the rotation shaft mounting portion.

According to this configuration, when each posture control actuator is driven, the rotation thereof is transmitted via the gear mechanism to the proximal side end link member, and the angle of the proximal side end link member changes. By so doing, the posture of the distal end side link hub relative to the proximal end side link hub is changed. Since the distal end side link hub is coupled to the proximal end side link hub via three or more quadric chain link mechanisms such that the posture of the distal end side link hub can be changed relative to the proximal end side link hub, this mechanism is compact in size, and also, can operate at high speed with high accuracy in a wide operating range.

Since the proximal side end link member is bent at the bent portion, the overall length in the radial direction of the link actuating device can be shortened and the link actuating device has a compact configuration. In addition, the at least a part of the gear mechanism is disposed in the space between the two virtual planes obtained by extending the radially inner edge and the radially outer edge of the one end of the bent portion in the longitudinal direction of the rotation shaft mounting portion. Therefore, bearings for supporting the rotation shaft and bearings for supporting the at least a part of the gear mechanism can be shared, and thus a more compact configuration is achieved. Moreover, since the at least a part of the gear mechanism is disposed in the space sandwiched between the two virtual planes, a structure can be achieved in which no component is disposed around a revolute pair section between the proximal end side link hub and the proximal side end link member. Accordingly, even when a bend angle formed by the central axis of the proximal end side link hub and the central axis of the distal end side link hub is increased, members such as the intermediate link member are unlikely to interfere with the gear mechanism, and thus, a wide operating range can be achieved.

In this present invention, the rotation shaft mounting portion may include two rotation shaft mounting bodies that are disposed so as to oppose each other and to which the rotation shaft is mounted, and the at least a part of the gear mechanism may be disposed between these two rotation shaft mounting bodies. When the rotation shaft mounting portion includes the two rotation shaft mounting bodies disposed so as to oppose each other, the rigidity of the rotation shaft mounting portion is high as compared to the case where the rotation shaft mounting portion is composed of one rotation shaft mounting body.

In the present invention, each of the rotation shaft mounting bodies may be composed of a plate-shaped member, for example, a metal plate, detachably mounted on the bent portion. When each rotation shaft mounting body is composed of the plate-shaped member, the rotation shaft mounting body can be produced by sheet metal working or the like at low cost with good mass productivity. In addition, by merely changing the size of the plate which is a raw material, the rotation shaft mounting body is capable of handling a difference in size of the link actuating device. Thus, it is easy to change the size of the link actuating device.

Both or one of the two rotation shaft mounting bodies may be formed in a bent shape such that an interval between the two rotation shaft mounting bodies at a location where the rotation shaft is mounted to the two rotation shaft mounting bodies is larger than that at a location where the two rotation shaft mounting bodies are fixed to the bent portion. In this case, a space for installing the at least a part of the gear mechanism is widened, and thus assemblability improves.

In the present invention, bearings that rotatably support both ends of the rotation shaft may be disposed at an outer side in a direction in which the two rotation shaft mounting bodies are aligned. With this configuration, a moment load to the bearings can be reduced, and thus the rigidity of the link actuating device can be improved. In addition, bearings for supporting the rotation shaft and bearings for supporting the at least a part of the gear mechanism can be shared, and thus, a compact configuration is achieved.

In the present invention, the gear mechanism may include a speed reduction mechanism configured to transmit the rotary motion by the posture control actuator to the proximal side end link member while reducing the speed of the rotary motion. When the gear mechanism is a speed reduction mechanism, a speed reduction mechanism accessorily provided to the posture control actuator can be omitted or can be a small-sized speed reduction mechanism. Thus the entire link actuating device can have a compact configuration.

In the present invention, the link actuating device may further include a gear box that accommodates the gear mechanism, the gear box may be fixed to the proximal end side link hub, the rotation shaft may be rotatably supported by the gear box via a bearing, a driving gear of the gear mechanism may be mounted on a gear box input shaft coupled to the posture control actuator, and a driven gear of the gear mechanism may be mounted on the rotation shaft. According to this feature, the gear mechanism, the rotation shaft and the bearing can be disposed together within the gear box, and therefore, it is easy to assemble the gear mechanism. In addition, when the gear mechanism is disposed within the gear box, improvement of safety, prevention of scattering of grease, prevention of entering of foreign matter into the gear mechanism, and the like, can be achieved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

In the accompanying drawings, like reference numerals are used to denote like parts throughout the several views, and.

DESCRIPTION OF EMBODIMENTS

Figure 1:
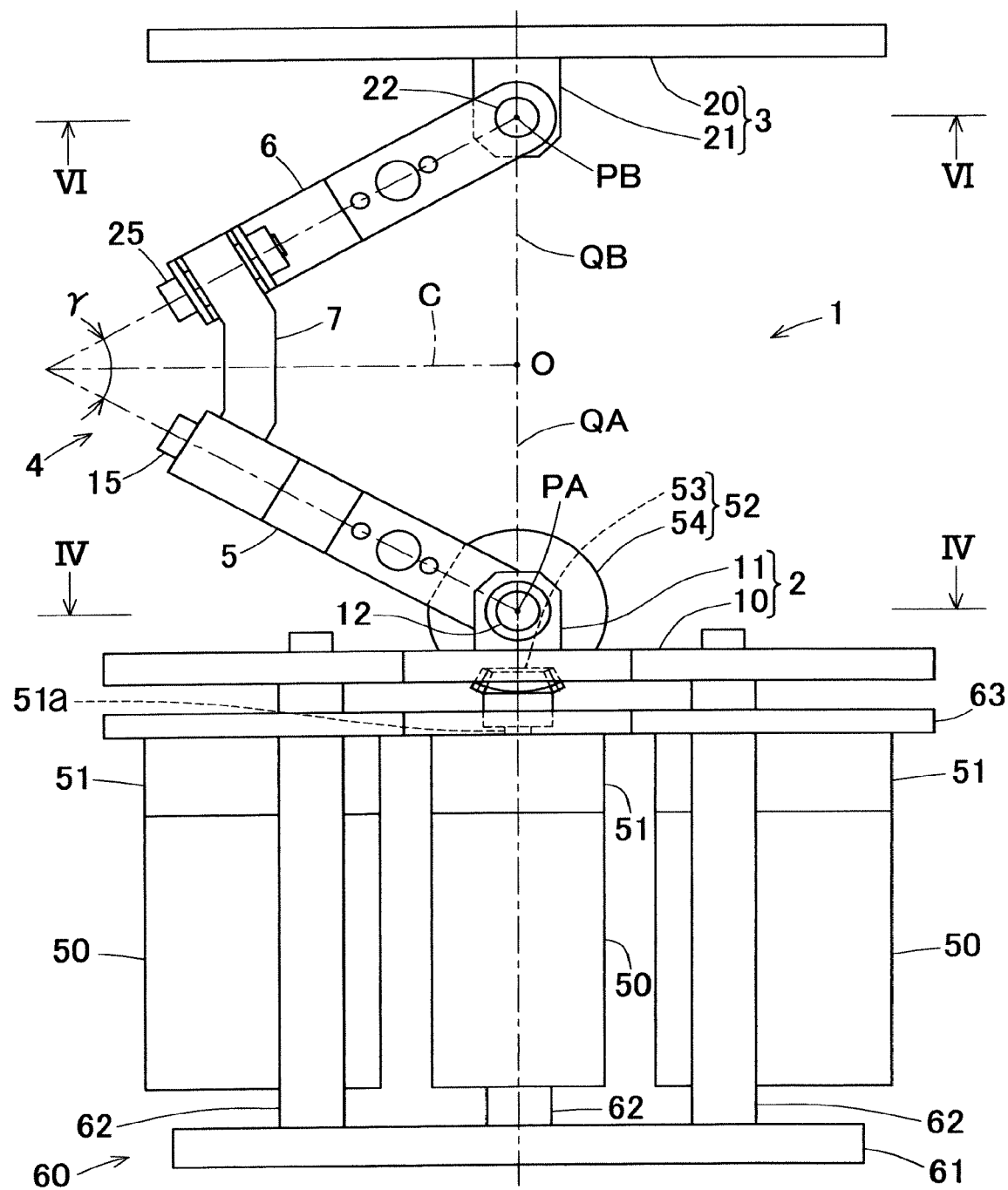
FIG. 1 is a front view of a link actuating device according to an embodiment of the present invention, wherein a part thereof is omitted.

A link actuating device according to an embodiment of the present invention will be described with reference to FIG. 1 to FIG. 8. FIG. 1 is a front view of the link actuating device, wherein a part thereof is omitted. The link actuating device includes: a parallel link mechanism 1; posture control actuators 50 that operate the parallel link mechanism 1; and a base 60 that supports the parallel link mechanism 1 and the posture control actuators 50.

Figure 2:
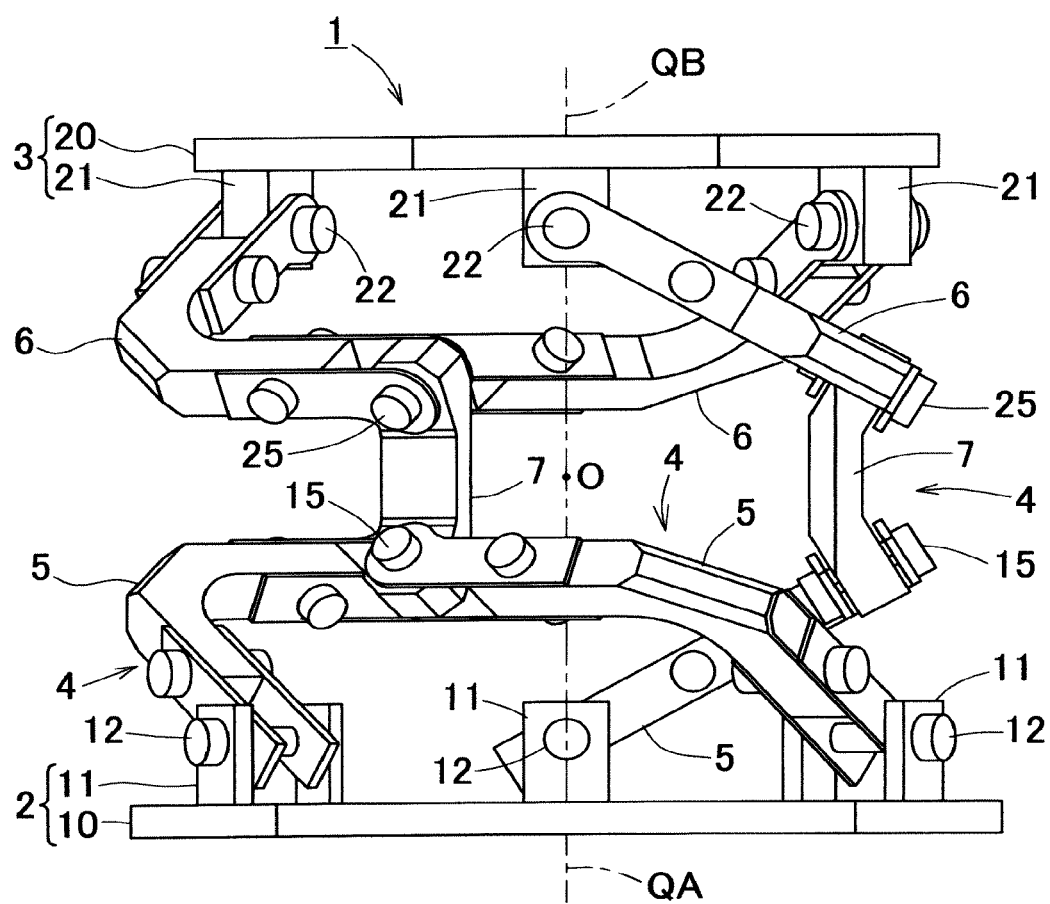
FIG. 2 is a diagram showing a state of a parallel link mechanism of the link actuating device.
Figure 3:
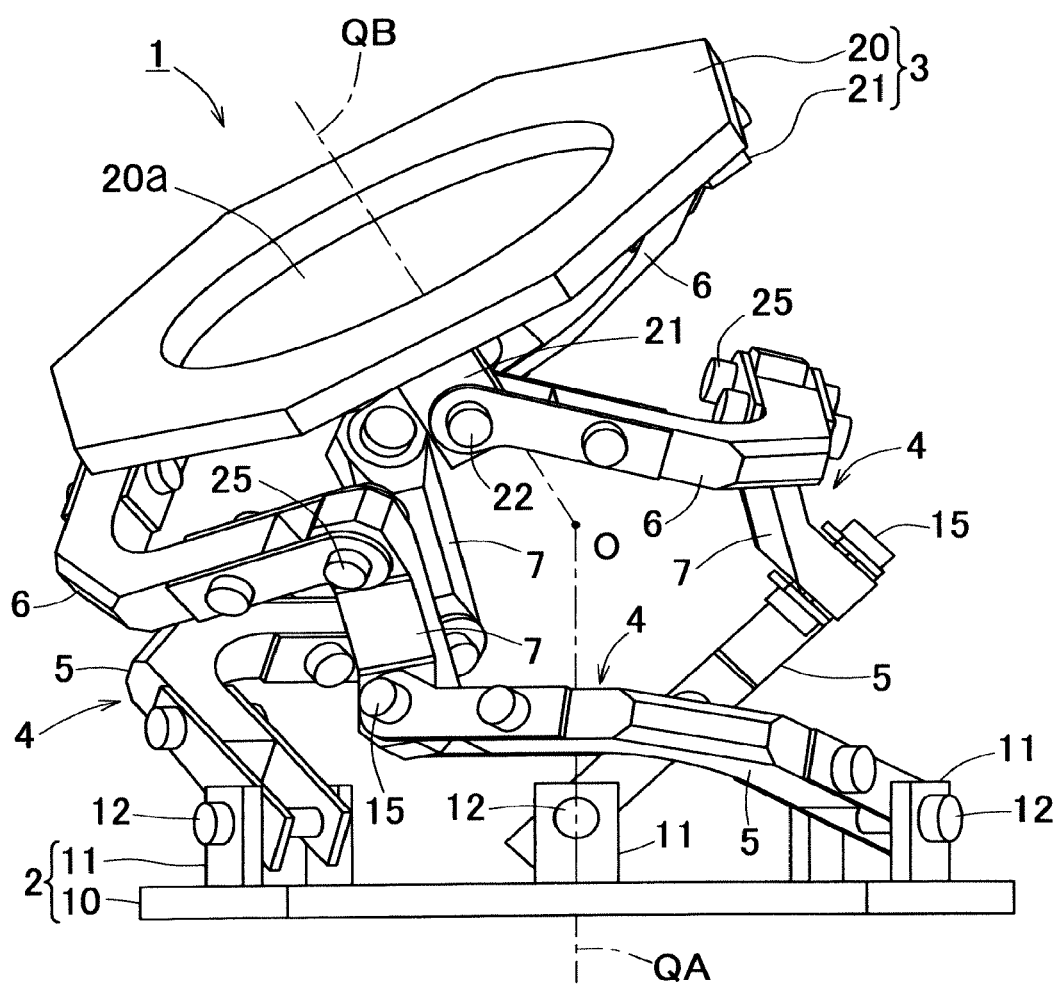
FIG. 3 is a diagram showing a different state of the parallel link mechanism.

FIG. 2 is a diagram showing a state of the parallel link mechanism and FIG. 3 is a diagram showing a different state of the parallel link mechanism. The parallel link mechanism 1 includes: a proximal end side link hub 2; a distal end side link hub 3; and three link mechanisms 4, in which the distal end side link hub 3 is coupled to the proximal end side link hub 2 via the three link mechanisms 4 such that the posture of the distal end side link hub 3 can be changed relative to the proximal end side link hub 2. FIG. 1 shows only one link mechanism 4. The number of link mechanisms 4 may be four or more.

As shown in FIG. 1 to FIG. 3, each link mechanism 4 includes: a proximal side end link member 5; a distal side end link member 6; and an intermediate link member 7, and forms a quadric chain link mechanism composed of four revolute pairs. The proximal side and distal side end link members 5 and 6 each have an L-shape. One end of the proximal side end link member 5 is rotatably coupled to the proximal end side link hub 2, and one end of the distal side end link member 6 is rotatably coupled to the distal end side link hub 3. The intermediate link member 7 has opposite ends to which the other ends of the proximal side and distal side end link members 5 and 6 are rotatably coupled, respectively.

The parallel link mechanism 1 is formed by combining two spherical link mechanisms. The central axis of the revolute pair between the proximal end side link hub 2 and the proximal side end link member 5 and the central axis of the revolute pair between the proximal side end link member 5 and the intermediate link member 7 intersect each other at a proximal end side spherical link center PA (FIG. 1). Similarly, the central axis of the revolute pair between the distal end side link hub 3 and the distal side end link member 6 and the central axis of the revolute pair between the distal side end link member 6 and the intermediate link member 7 intersect each other at a distal end side spherical link center PB (FIG. 1). In addition, the distances from the proximal end side spherical link center PA to the revolute pairs between the proximal end side link hub 2 and the proximal side end link member 5 are equal to each other, and the distances from the proximal end side spherical link center PA to the revolute pairs between the proximal end link member 5 and the intermediate link member 7 are also equal to each other. Similarly, the distances from the distal end side spherical link center PB to the revolute pairs between the distal end side link hub 3 and the distal side end link member 6 are equal to each other, and the distances from the distal end side spherical link center PB to the revolute pairs between the distal end link member 6 and the intermediate link member 7 are also equal to each other. The central axis of the revolute pair between the proximal end link member 5 and the intermediate link member 7, and the central axis of the revolute pair between the distal end link member 6 and the intermediate link member 7 may form a certain cross angle γ (FIG. 1), or may be parallel to each other.

Figure 4:
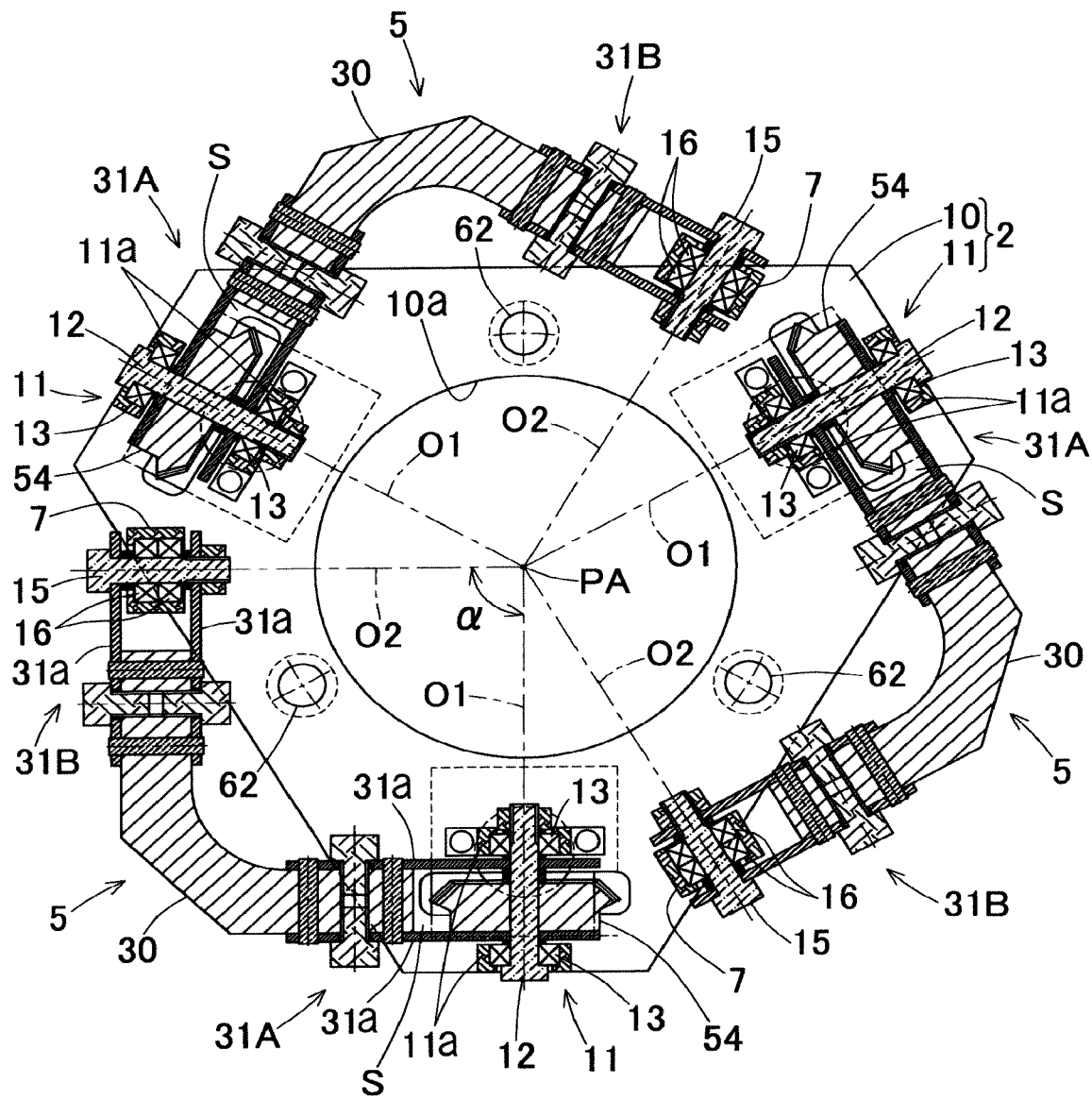
FIG. 4 is a cross-sectional view taken along a line IV-IV in FIG. 1.

FIG. 4 is a cross-sectional view taken along a line IV-IV in FIG. 1. FIG. 4 shows a relationship between the proximal end side spherical link center PA and the central axes O1 of the revolute pairs between the proximal end side link hub 2 and the proximal side end link members 5. FIG. 6 is a cross-sectional view taken along a line VI-VI in FIG. 1. FIG. 6 shows a relationship between the distal end side spherical link center PB and the central axes O1 between the revolute pairs between the distal end side link hub 3 and the distal side end link members 6. In the example shown in FIGS. 4-7, the angle α formed by the central axis O1 of the revolute pair between the proximal end side link hub 2 (the distal end side link hub 3) and the proximal side end link member 5 (the distal side end link member 6) and the central axis O2 of the revolute pair between the proximal side end link member 5 (the distal side end link member 6) and the intermediate link member 7 is set at 90°, but may be an angle other than 90°. The angle α is preferably 70° to 110° and more preferably 80° to 100°.

Figure 8:
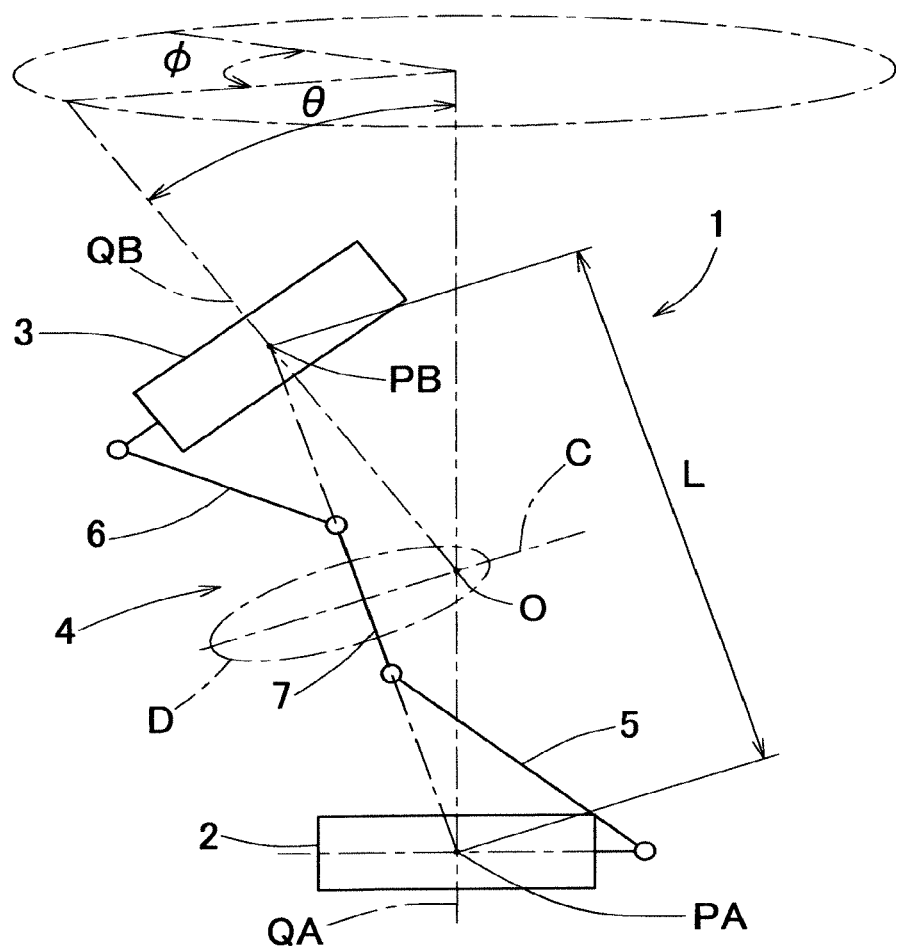
FIG. 8 is a diagram showing a link mechanism of the parallel link mechanism with straight lines.

The three link mechanisms 4 have a geometrically identical configuration. The geometrically identical configuration means that, as shown in FIG. 8, a geometric model depicted with straight lines representing the link members 5, 6, and 7, that is, a model depicted with the revolute pairs and straight lines connecting these revolute pairs, represents a shape in which the proximal end side portion thereof and the distal end side portion thereof are symmetrical with each other with respect to the center portion of the intermediate link member 7. FIG. 8 shows one link mechanism 4 depicted with straight lines. The parallel link mechanism 1 according to this embodiment is of a rotation symmetrical type, and has a positional configuration in which the positional relationship between a proximal side portion composed of the proximal end side link hub 2 and the proximal side end link member 5, and a distal side portion composed of the distal end side link hub 3 and the distal side end link member 6, is in rotation symmetry relative to a center line C of the intermediate link member 7. The center portion of each intermediate link member 7 is located on a common orbital circle D.

The proximal end side link hub 2, the distal end side link hub 3 and the three link mechanisms 4 cooperates together to form a two-degrees-of-freedom mechanism in which the distal end side link hub 3 is rotatable about two mutually orthogonal axes relative to the proximal end side link hub 2. In other words, the distal end side link hub 3 can rotate with two degrees of freedom to change its posture, relative to the proximal end side link hub 2. This two-degrees-of-freedom mechanism is compact in size, and also, can achieve a wide range of movement for the distal end side link hub 3 relative to the proximal end side link hub 2.

For example, when straight lines that pass through the proximal end side spherical link center PA (the distal end side spherical link center PB) and that intersect the central axis O1 (FIG. 4, FIG. 6) of the revolute pair between the proximal end side link hub 2 (the distal end side link hub 3) and the proximal side end link member 5 (the distal side end link member 6) at a right angle is defined as a central axis QA of the proximal end side link hub 2 (a central axis QB of the distal end side link hub 3), the maximum value of a bend angle θ (FIG. 8) between the central axis QA of the proximal end side link hub 2 and the central axis QB of the distal end side link hub 3 can be about ±90°. In addition, an angle of traverse φ (FIG. 8) of the distal end side link hub 3 relative to the proximal end side link hub 2 can be set in the range of 0° to 360°. The bend angle θ means a vertical angle formed when the central axis QB of the distal end side link hub 3 is inclined relative to the central axis QA of the proximal end side link hub 2. The angle of traverse φ means a horizontal angle formed when the central axis QB of the distal end side link hub 3 is inclined relative to the central axis QA of the proximal end side link hub 2.

Change of the posture of the distal end side link hub 3 relative to the proximal end side link hub 2 is performed with, as a rotation center, the point of intersection O of the central axis QA of the proximal end side link hub 2 and the central axis QB of the distal end side link hub 3. FIG. 2 shows a state where the central axis QA of the proximal end side link hub 2 and the central axis QB of the distal end side link hub 3 are on the same line. FIG. 3 shows a state where the central axis QB of the distal end side link hub 3 forms a certain operating angle relative to the central axis QA of the proximal end side link hub 2. Even when the posture is changed, the distance L (FIG. 8) between the proximal and distal end side spherical link centers PA and PB does not change.

In the parallel link mechanism 1, if the angular positional relationships between the intermediate link member 7 and the proximal side and distal side end link members 5 and 6 with respect to the symmetry plane of the intermediate link member 7 are made identical between the proximal end side and the distal end side and further the following conditions are satisfied, the proximal side portion composed of the proximal end side link hub 2 and each proximal side end link member 5, and the distal side portion composed of the distal end side link hub 3 and each distal side end link member 6 move in the same manner due to the geometrical symmetry. The conditions are: the angles of the central axis O1 of the revolute pair between the proximal end side link hub 2 (the distal end side link hub 3) and the proximal side end link member 5 (the distal side end link member 6) in each link mechanism 4 and the lengths from the proximal end side spherical link center PA (the distal end side spherical link center PB) to the revolute pair between the proximal end side link hub 2 (the distal end side link hub 3) and the proximal side end link member 5 (the distal side end link member 6) are equal to each other; the central axis O1 of the revolute pair between the proximal end side link hub 2 (the distal end side link hub 3) and the proximal side end link member 5 (the distal side end link member 6) of each link mechanism 4 and the central axis O2 of the revolute pair between the proximal side end link member 5 (the distal side end link member 6) and the intermediate link member 7 intersect the proximal end side spherical link center PA (the distal end side spherical link center PB); the geometrical shapes of the proximal side end link member 5 and the distal side end link member 6 are the same; and the shape of the intermediate link member 7 is the same between the proximal end side and the distal end side.

As shown in FIG. 4, the proximal end side link hub 2 includes a flat plate-shaped proximal end member 10 having a circular through hole 10a defined in a center portion thereof, and three rotation support members 11 provided equidistantly around the through hole 10a of the proximal end member 10 in the circumferential direction. The center of the through hole 10a is located on the central axis QA of the proximal end side link hub 2. Each rotation support member 11 has a pair of rotation support bodies 11a spaced apart from each other in the radial direction of the through hole 10a, and both ends of a rotation shaft 12 are rotatably supported by the pair of rotation support bodies 11a via bearings 13 so as to intersect the central axis QA (FIG. 1) of the proximal end side link hub 2. The rotation shaft 12 is mounted to one end of the proximal side end link member 5. The one end of the proximal side end link member 5 is located between the pair of rotation support bodies 11a.

Each bearing 13 is a ball bearing such as a deep groove ball bearing and an angular contact ball bearing. The bearing 13 is fixed to the rotation support body 11a by a method such as press-fit, adhesion, crimping or the like. The same applies to the type of bearing and mounting method for bearings provided to the other revolute pair sections. Instead of using the bearings 13 as in this example, the rotation shaft 12 may be rotatably supported by bringing the rotation shaft 12 into contact with the rotation support bodies 11a such that the rotation shaft 12 is rotatable.

A rotation shaft 15 is mounted to the other end of the proximal side end link member 5. The rotation shaft 15 is rotatably supported by one end of the intermediate link member 7 via two bearings 16. Instead of using the bearing 16, the rotation shaft 15 may be rotatably supported by bringing the rotation shaft 15 into contact with the one end of the intermediate link member 7 such that the rotation shaft 15 is rotatable.

As shown in FIG. 6, the distal end side link hub 3 includes a flat plate-shaped distal end member 20 having a circular through hole 20a defined in a center portion thereof, and three rotation support members 21 provided equidistantly around the through hole 20a of the distal end member 20 in the circumferential direction. The center of the through hole 20a is located on the central axis QB of the distal end side link hub 3. A rotation shaft 22 is rotatably supported by each rotation support member 21 via bearings 23 so as to intersect the central axis QB (FIG. 1) of the distal end side link hub 3. The rotation shaft 22 is mounted to one end of the distal side end link member 6.

A rotation shaft 25 is mounted to the other end of the distal side end link member 6. The rotation shaft 25 is rotatably supported by the other end of the intermediate link member 7 via two bearings 26. Instead of using the bearing 26, the rotation shaft 25 may be rotatably supported by bringing the rotation shaft 25 into contact with the other end of the intermediate link member 7 such that the rotation shaft 25 is rotatable.

The configurations of the proximal side and distal side end link members 5 and 6 will be described with reference to FIG. 5, which is a partially enlarged view of FIG. 4, and FIG. 7, which is a partially enlarged view of FIG. 6. The proximal side and distal side end link members 5 and 6 have the same configuration except for a part thereof. Here, the proximal side end link member 5 will be described as a representative, and for the distal side end link 6, reference numerals for corresponding portions are described in parentheses. Portions different in configuration between the proximal side and distal side end link members 5 and 6 will be described as necessary.

Figure 5:
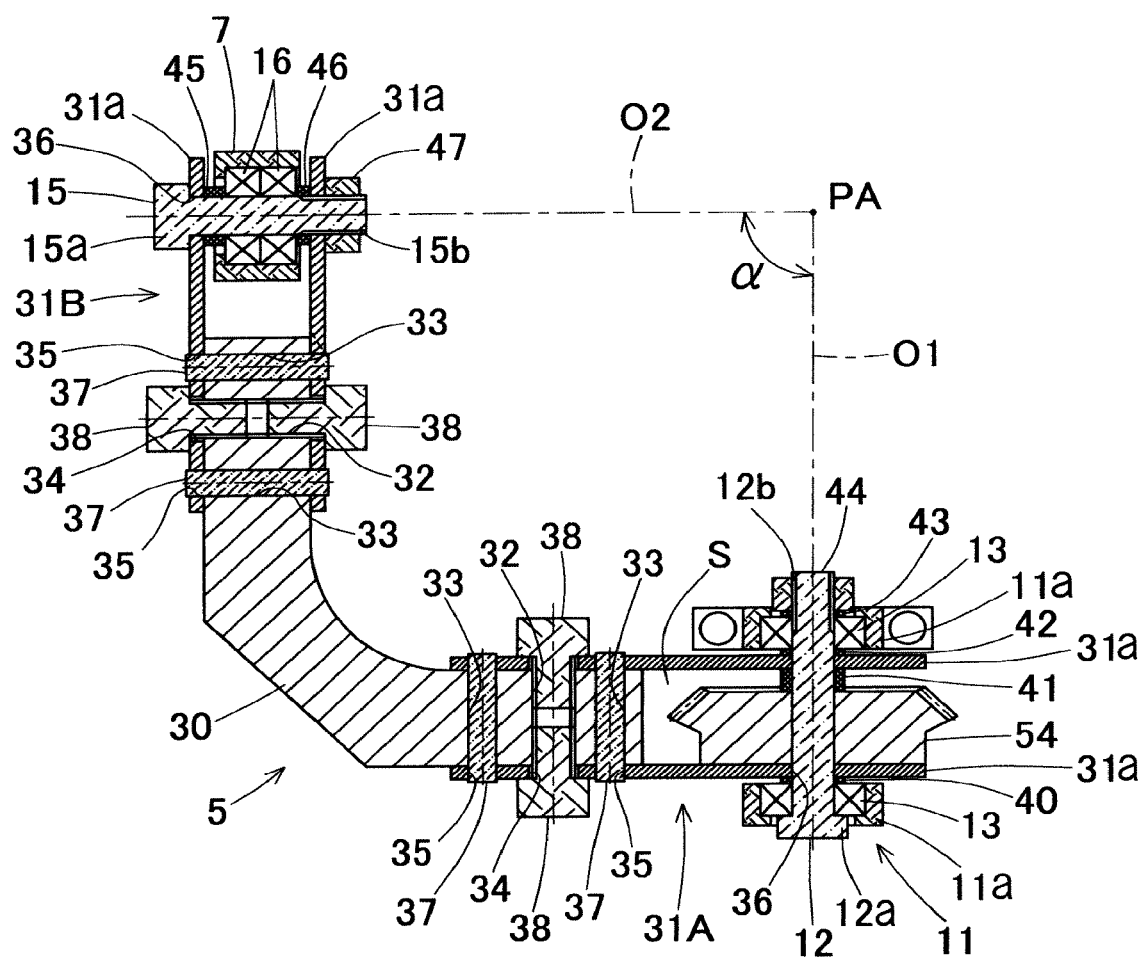
FIG. 5 is a partially enlarged view of FIG. 4.
Figure 6:
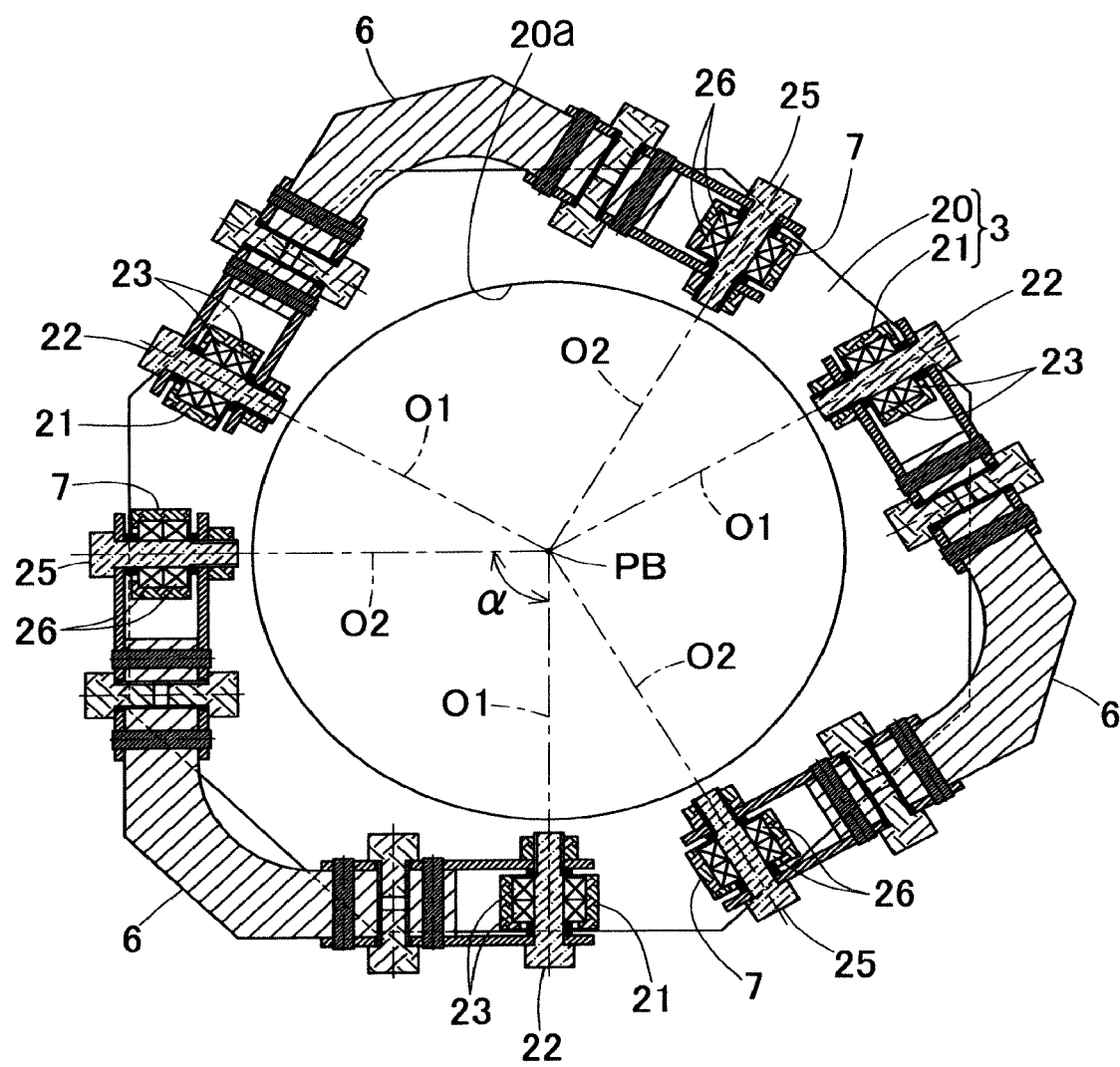
FIG. 6 is a cross-sectional view taken along a line VI-VI in FIG. 1.

As shown in FIG. 5 (FIG. 7), the proximal side end link member 5 (the distal side end link member 6) includes one bent portion 30, and a link hub side rotation shaft mounting portion 31A and an intermediate link side rotation shaft mounting portion 31B, both of which are fixed to opposite ends of the bent portion 30, respectively. In this embodiment, each of the rotation shaft mounting portions 31A and 31B includes two rotation shaft mounting bodies 31a that are fixed to the outer-diameter-side surface and the inner-diameter-side surface of an end portion of the bent portion 30, respectively.

The bent portion 30 is, for example, a casting made of a metallic material and has a shape bent at a predetermined angle α (90° in this example). The bending angle α may be arbitrarily determined. At each end of the bent portion 30, one bolt threaded hole 32 is provided so as to penetrate between the outer-diameter-side surface and the inner-diameter-side surface, and two positioning holes 33 are provided so as to be located at respective sides of the bolt threaded hole 32.

Each of the rotation shaft mounting bodies 31a of the rotation shaft mounting portions 31A and 31B is formed in a predetermined shape by performing working such as sheet metal working on a plate-shaped member having a uniform thickness such as a metal plate. The shape of each rotation shaft mounting body 31a is, for example, an elongated straight shape, and each rotation shaft mounting body 31a is provided with one bolt insertion hole 34 corresponding to the bolt threaded hole 32 of the bent portion 30, two positioning holes 35 corresponding to the positioning holes 33 of the bent portion 30, and a through hole 36 through which any of the rotation shafts 12, 15, 22, and 25 is inserted. When a plate-shaped member having a simple shape and a uniform thickness is used as the raw material for each rotation shaft mounting body 31a, the rotation shaft mounting body 31a can be produced at low cost and the mass productivity thereof is excellent. Particularly, when the raw material is a metal plate, working for the contour shape and the respective holes 34, 35 and 36 is easy.

In fixing the bent portion 30 and each rotation shaft mounting body 31a to each other, a positioning pin 37 is inserted through the positioning hole 33 of the bent portion 30 and the positioning holes 35 of the respective rotation shaft mounting bodies 31a at the outer diameter side and the inner diameter side so as to position the bent portion 30 and the rotation shaft mounting body 31a. In this state, bolts 38 are inserted through the bolt insertion holes 34 of the respective rotation shaft mounting bodies 31a from the outer diameter side and the inner diameter side, respectively, and then, are screwed into the bolt threaded hole 32 of the bent portion 30. That is, the rotation shaft mounting bodies 31a at the outer diameter side and the inner diameter side are individually fixed to the bent portion 30 by the bolts 38, which are different from each other, in a state where the rotation shaft mounting bodies 31a are positioned by the common positioning pin 37. By using the positioning pin 37 as described above, assembling is rendered to be easy, and variations in accuracy of assembling by a worker are reduced. In addition, the accuracy of the positional relationship between the bent portion 30 and each rotation shaft mounting body 31a improves, and thus, the parallel link mechanism 1 can be smoothly operated.

Regarding the rotation shaft mounting portion 31A at the link hub side in the proximal side end link member 5, as shown in FIG. 5, a bevel gear 54 forming a part of a gear mechanism 52 (FIG. 1) described later is disposed in the space between the two rotation shaft mounting bodies 31a at the outer diameter side and the inner diameter side, and the pair of rotation support bodies 11a of the rotation support member 11 are disposed radially outward of the rotation shaft mounting bodies 31a. In the case of this embodiment, the space between the two rotation shaft mounting bodies 31a at the outer diameter side and the inner diameter side is a space S sandwiched between two virtual planes obtained by extending the radially inner edge and the radially outer edge of one end of the bent portion 30 in the longitudinal direction of the rotation shaft mounting portion 31A. Via the rotation shaft 12, the proximal side end link member 5 and the rotation support member 11 are rotatably coupled to each other, and the proximal side end link member 5 and the bevel gear 54 are also coupled to each other so as to rotate integrally together. Specifically, these components are coupled as follows.

The rotation shaft 12 has, at an outer diameter end thereof, a head portion 12a having a larger diameter than the other portion, and has an external thread portion 12b at an inner diameter end thereof. The rotation shaft 12 is inserted, from the radially outer side, through respective through holes of the inner ring of the bearing 13 at the outer diameter side, a spacer 40, the rotation shaft mounting body 31a at the outer diameter side, the bevel gear 54, a spacer 41, the rotation shaft mounting body 31a at the inner diameter side, a spacer 42, the inner ring of the bearing 13 at the inner diameter side, and a spacer 43 in this order, and then, a nut 44 is screwed onto the external thread portion 12b. Accordingly, the inner rings of the two bearings 13, the two rotation shaft mounting bodies 31a, the one bevel gear 54 and the four spacers 40, 41, 42 and 43 are held between the head portion 12a of the rotation shaft 12 and the nut 44. By so doing, the proximal side end link member 5, the rotation support member 11 and the bevel gear 54 are coupled, in a state where a preload is applied to the bearings 13.

Figure 7:
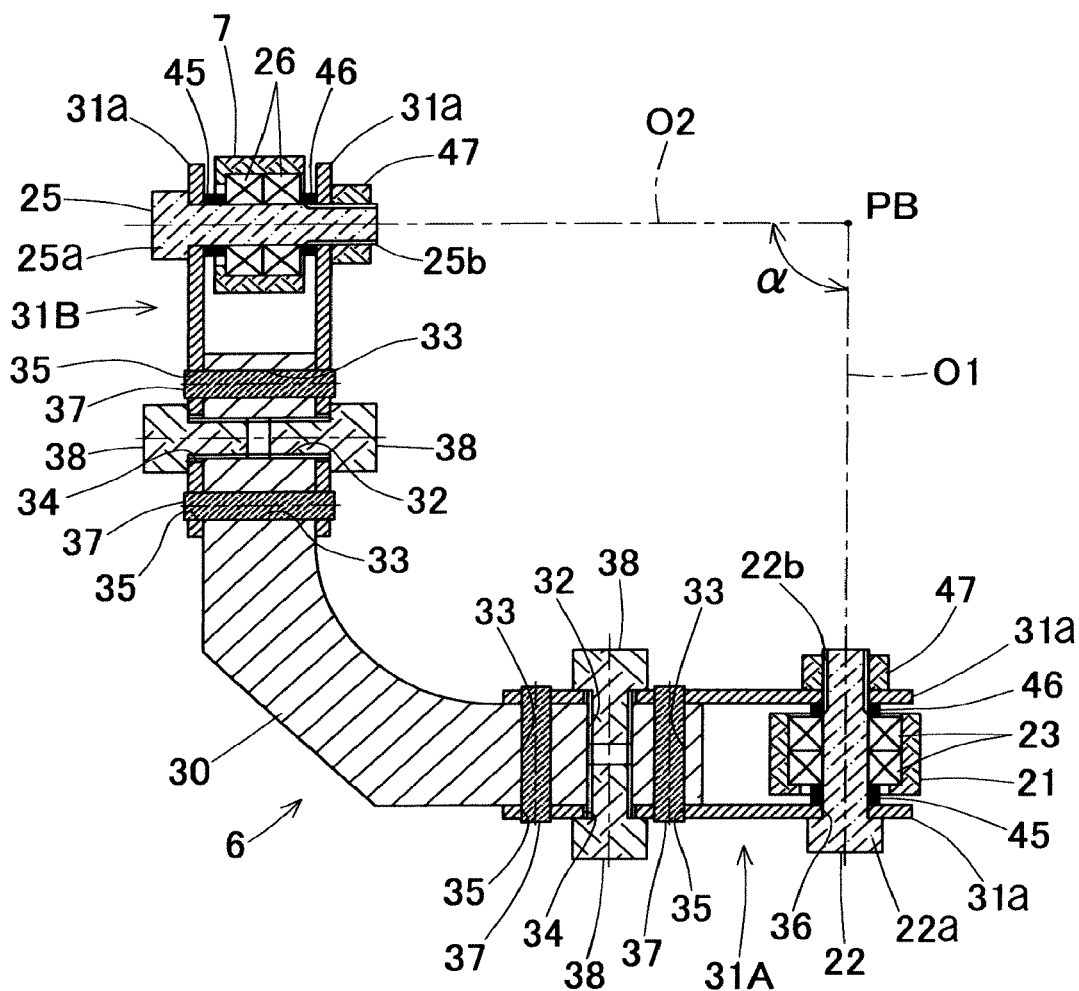
FIG. 7 is a partially enlarged view of FIG. 6.

Regarding the rotation shaft mounting portion 31A at the link hub side in the distal side end link member 6, as shown in FIG. 7, the rotation support member 21 is disposed between the two rotation shaft mounting bodies 31a at the outer diameter side and the inner diameter side. The distal side end link member 6 and the rotation support member 21 are rotatably coupled to each other via the rotation shaft 22. Specifically, these members are coupled as follows.

The rotation shaft 22 has, at an outer diameter end thereof, a head portion 22a having a larger diameter than the other portion, and has an external thread portion 22b at an inner diameter end thereof. The rotation shaft 22 is inserted, from the radially outer side, through respective through holes of the rotation shaft mounting body 31a at the outer diameter side, a spacer 45, the inner rings of the two bearings 23, a spacer 46 and the rotation shaft mounting body 31a at the inner diameter side in this order, and then, a nut 47 is screwed onto the external thread portion 22b. Accordingly, the two rotation shaft mounting bodies 31a, the inner rings of the two bearings 23 and the two spacers 45 and 46 are held between the head portion 22a of the rotation shaft 22 and the nut 47. By so doing, the distal side end link member 6 and the rotation support member 21 are rotatably coupled to each other, in a state where a preload is applied to the bearings 23.

Regarding the rotation shaft mounting portion 31B at the center link side in the proximal side end link member 5 (the distal side end link member 6), as shown in FIG. 5 (FIG. 7), one end (the other end) of the intermediate link member 7 is disposed between the two rotation shaft mounting bodies 31a at the outer diameter side and the inner diameter side. The proximal side end link member 5 (the distal side end link member 6) and the intermediate link member 7 are rotatably coupled to each other via the rotation shaft 15 (25). Specifically, these members are coupled as follows.

The rotation shaft 15 (25) has, at an outer diameter end thereof, a head portion 15a (25a) having a larger diameter than the other portion, and has an external thread portion 15b (25b) at an inner diameter end thereof. The rotation shaft 15 (25) is inserted, from the radially outer side, through respective through holes of the rotation shaft mounting body 31a at the outer diameter side, the spacer 45, the inner rings of the two bearings 16 (26), the spacer 46 and the rotation shaft mounting body 31a at the inner diameter side in this order, and then, the nut 47 is screwed onto the external thread portion 15b (25b). Accordingly, the two rotation shaft mounting bodies 31a, the inner rings of the two bearings 16 (26) and the two spacers 45 and 46 are held between the head portion 15a (25a) of the rotation shaft 15 (25) and the nut 47. By so doing, the proximal side end link member 5 (the distal side end link member 6) and the rotation support member 11

(21) are rotatably coupled to each other, in a state where a preload is applied to the bearings 16 (26).

In FIG. 1, the base 60 includes a base plate 61 installed on a floor surface and a plurality of posts 62 provided so as to extend upward from the base plate 61. The proximal end member 10 of the parallel link mechanism 1 is supported on the upper ends of the plurality of posts 62. In addition, a plate-shaped motor mounting member 63 is horizontally provided at upper portions of the plurality of posts 62, and the posture control actuators 50 are mounted on the motor mounting member 63 in a suspended state. In the shown example, the number of the posture control actuators 50 is three, which is equal to the number of the link mechanisms 4 of the parallel link mechanism 1. However, when the posture control actuators 50 are provided to at least two of the three link mechanisms 4, the parallel link mechanism 1 can be operated.

Each posture control actuator 50 includes a rotary motor which is provided with an accessory speed reduction mechanism 51. An output shaft 51a projects upward from the speed reduction mechanism 51. In addition to the accessory speed reduction mechanism 51, the gear mechanism 52 that serves as a speed reduction mechanism is provided. The gear mechanism 52 includes a driving bevel gear 53 mounted on the output shaft 51a of the speed reduction mechanism 51, and the driven bevel gear 54 mounted on the rotation shaft 12 at the revolute pair section between the proximal end side link hub 2 and the proximal side end link member 5.

The link actuating device operates the parallel link mechanism 1 by rotationally driving each posture control actuator 50. Specifically, when each posture control actuator 50 is rotationally driven, the rotation of the actuator 50 is transmitted via the speed reduction mechanism 51 and the gear mechanism 52 to the rotation shaft 12 while the speed of the rotation is reduced. By so doing, the proximal side end link member 5 changes its angle, whereby the posture of the distal end side link hub 3 relative to the proximal end side link hub 2 is changed. Since the parallel link mechanism 1 has a configuration in which the distal end side link hub 3 is coupled to the proximal end side link hub 2 via the three quadric chain link mechanisms 4 such that the posture of the distal end side link hub 3 can be changed relative to the proximal end side link hub 2, the parallel link mechanism 1 is compact in size, and also, can operate at high speed with high accuracy in a wide operating range. Since the gear mechanism 52 serves as a speed reduction mechanism, it is possible to omit the accessory speed reduction mechanism 51 or use a small-sized speed reduction mechanism in the posture control actuator 50.

Since each of the proximal side and distal side end link members 5 and 6 is bent at the bent portion 30, the overall length in the radial direction of the link actuating device can be shortened, and therefore, the link actuating device has a compact configuration. Each of the rotation shaft mounting portions 31A and 31B of the proximal side and distal side end link members 5 and 6 includes the two rotation shaft mounting bodies 31a. Since each rotation shaft mounting body 31a is composed of a metal plate detachably mounted on the bent portion 30, the rotation shaft mounting body 31a can be produced by sheet metal working at low cost with good mass productivity. By merely changing the size of the metal plate which is a raw material, the rotation shaft mounting body 31a is capable of handling a difference in size of the link actuating device. Thus, it is easy to change the size of the link actuating device.

When each of the proximal side and distal side end link members 5 and 6 is divided into two types of sections, that is, the bent portion 30 and the rotation shaft mounting portions 31A and 31B, each section can be formed in a simple shape. Therefore, the working cost can be reduced and the mass productivity improves. When the respective rotation shaft mounting bodies 31a of the rotation shaft mounting portions 31A and 31B are formed in shapes that are the same as each other, the components can be shared. As a result, the cost is low, and the mass productivity is good.

However, the thicknesses or the shapes of the respective rotation shaft mounting bodies 31a may be made different from each other in accordance with the locations at which the rotation shaft mounting bodies 31a are used and the strength required for the rotation shaft mounting bodies 31a. In the case of this embodiment, since the bevel gear 54 is disposed between the two rotation shaft mounting bodies 31a, the rotation shaft mounting bodies 31a used at the revolute pair section between the proximal end side link hub 2 and the proximal side end link member 5 are each formed in a shape in which a distal end portion thereof from the through hole 36 extends long in the longitudinal direction as compared to the rotation shaft mounting bodies 31a used at the other locations.

The revolute pair section between the proximal end side link hub 2 and the proximal side end link member 5 has the following operation and effect. Since the bevel gear 54 forming a part of the gear mechanism 52 is disposed between the two rotation shaft mounting bodies 31a, the bearings 13 for supporting the rotation shaft 12 and the bearings 13 for supporting the bevel gear 54 can be shared, and thus, a more compact configuration is achieved.

When at least a part of the gear mechanism 52 is disposed between the two rotation shaft mounting bodies 31a, a structure can be achieved in which no component is disposed around the revolute pair section between the proximal end side link hub 2 and the proximal side end link member 5. Accordingly, even when the bend angle θ is increased, members such as the intermediate link member 7 are unlikely to interfere with the gear mechanism 52, and thus, a wide operating range can be achieved.

Since the bearings 13 that rotatably support both ends of the rotation shaft 12 are disposed at the outer side in the direction in which the two rotation shaft mounting bodies 31a are aligned, a moment load to the bearings 13 can be reduced, and thus, the rigidity of the link actuating device can be improved. In addition, when the bearings 13 are disposed as described above, the bearings 13 for supporting the rotation shaft 12 and the bearings 13 for supporting the bevel gear 54 can be more easily shared.

Figure 9:
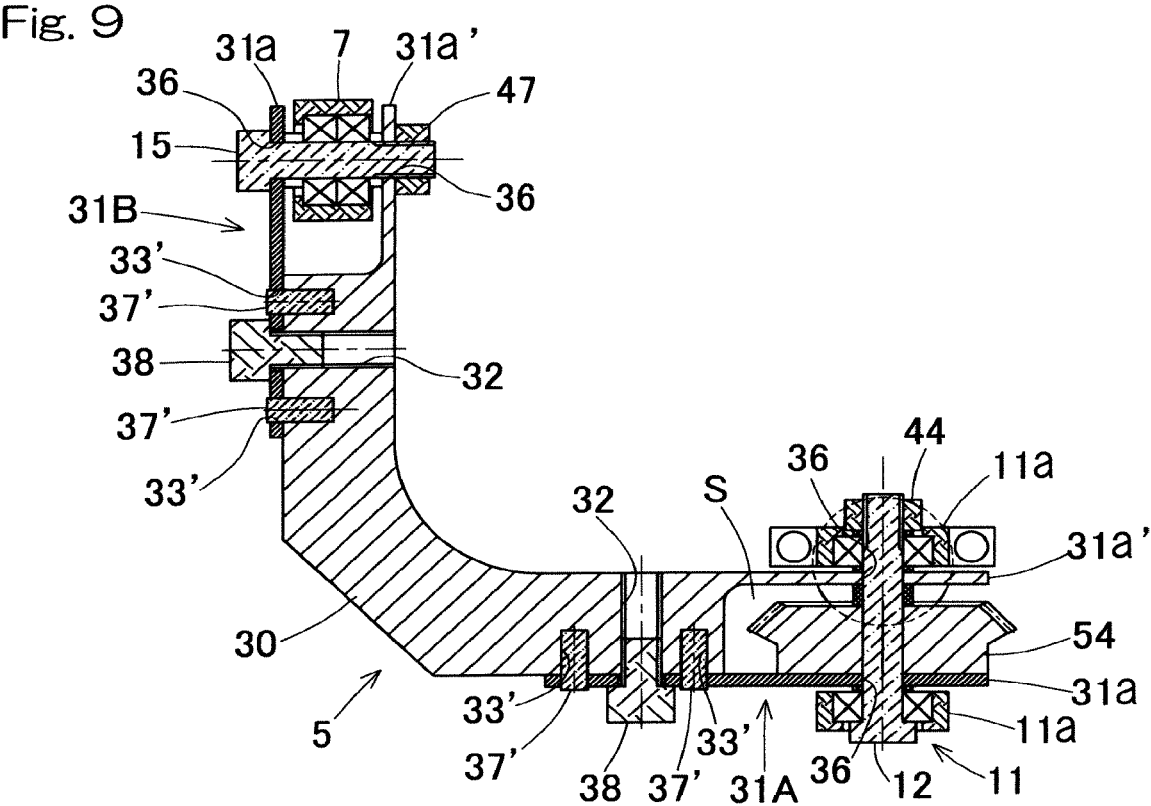
FIG. 9 is a cross-sectional view of a proximal side end link member having a configuration different from that shown in FIG. 5.

FIG. 9 shows a proximal side end link member having a configuration different from that shown in FIG. 5. In the proximal side end link member 5 shown in FIG. 9, of two rotation shaft mounting bodies 31a and 31a' of the rotation shaft mounting portion 31, one rotation shaft mounting body 31a'(at the inner diameter side in this example) is formed so as to be integrated with the bent portion 30. A through hole 36 through which the rotation shaft 12 is inserted is provided in the rotation shaft mounting body 31a'. In addition, a positioning hole 33' is provided in the bent portion 30 and only in a surface on which the rotation shaft mounting body 31a that is a separate member is mounted (an outer diameter surface thereof in this example). The rotation shaft mounting body 31a is positioned by inserting a positioning pin 37' into the positioning hole 33'. With this configuration, only one rotation shaft mounting body 31a needs to be mounted on the bent portion 30, and thus assemblability improves.

Figure 10:
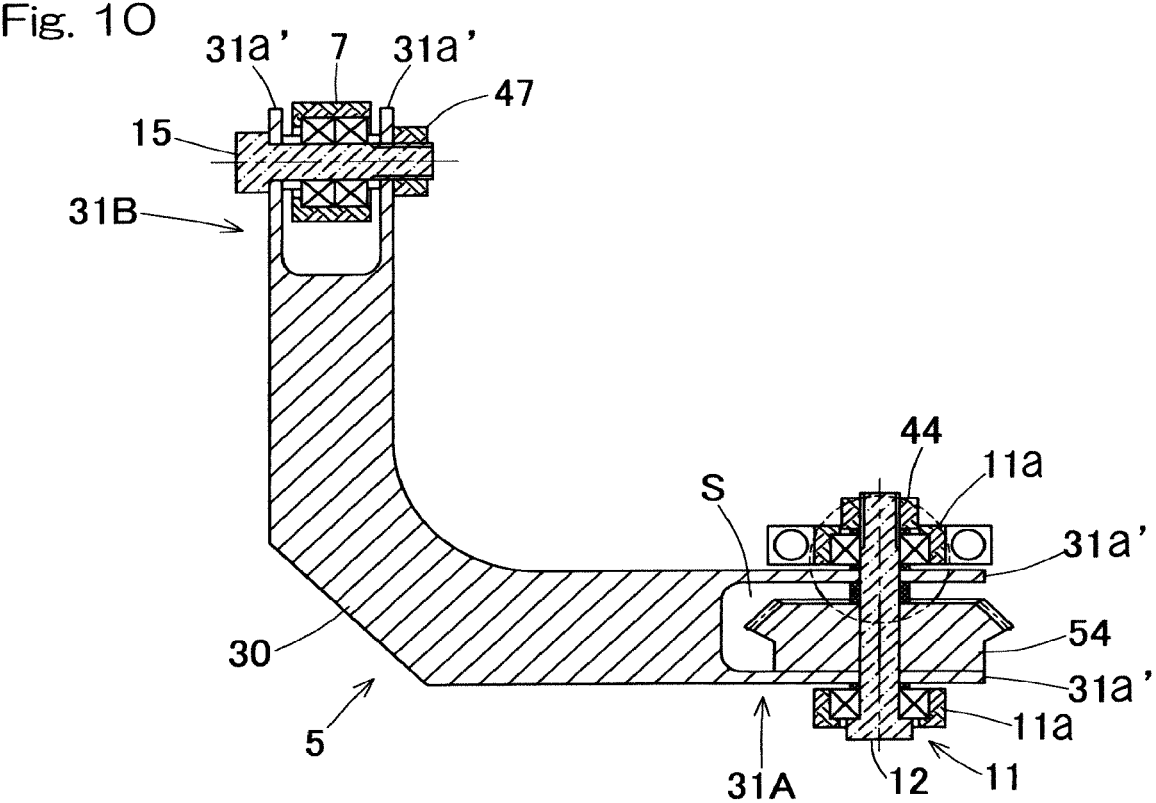
FIG. 10 is a cross-sectional view of a proximal side end link member having a still different configuration.

As shown in FIG. 10, both of two rotation shaft mounting bodies 31a' of the rotation shaft mounting portion 31 may be formed so as to be integrated with the bent portion 30. In this case, work for mounting each rotation shaft mounting body 31*a*' to the bent portion 30 is unnecessary, and thus the assemblability further improves. The configurations in FIG. 9 and FIG. 10 are also applicable to the distal side end link member 6.

Figure 11:
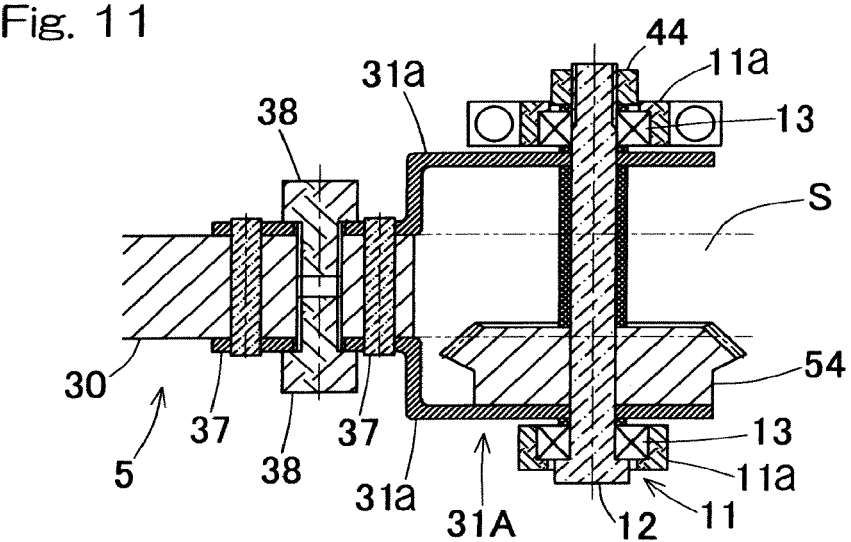
FIG. 11 is a cross-sectional view of a revolute pair section, between a proximal end side link hub and a proximal side end link member, having a configuration different from that shown in FIG. 5.

FIG. 11 shows a rotation shaft mounting portion, at the link hub side of a proximal side end link member, having a configuration different from that shown in FIG. 5. In the rotation shaft mounting portion 31A shown in FIG. 11, by using rotation shaft mounting bodies 31*a* each formed into a bent shape by bending, the interval between the two rotation shaft mounting bodies 31*a* at a location where the rotation shaft 12 is mounted to the two rotation shaft mounting bodies 31*a* is made larger than that at a location where the two rotation shaft mounting bodies 31*a* are fixed to the bent portion 30. Accordingly, the space for installing the bevel gear 54 is widened, and thus, the assemblability improves. Even in the case where the rotation shaft mounting bodies 31*a* each formed into a bent shape are used, at least a part of the bevel gear 54 is located in a space S sandwiched between two virtual planes obtained by extending the radially inner edge and the radially outer edge of one end of the bent portion 30 in the longitudinal direction of the rotation shaft mounting portion 31A. In the example shown in FIG. 11, each of the two rotation shaft mounting bodies 31*a* is formed in a bent shape. However, only one of the rotation shaft mounting bodies 31*a* may be formed in a bent shape.

Figure 12:
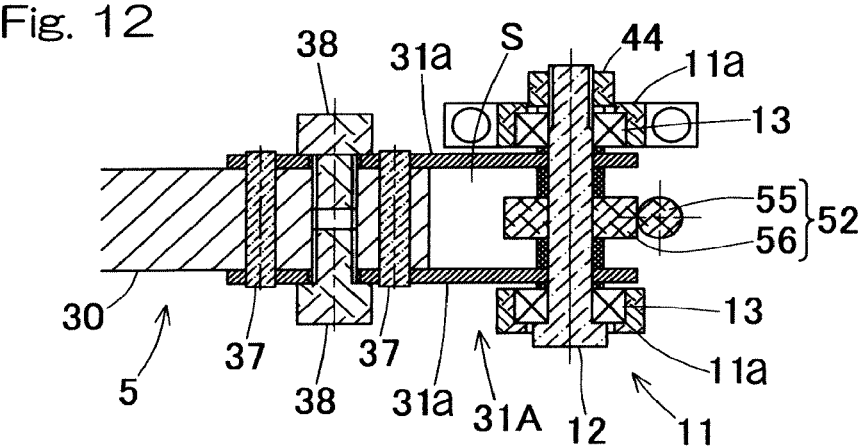
FIG. 12 is a cross-sectional view of a revolute pair section, between a proximal end side link hub and a proximal side end link member, having a still different configuration.

FIG. 12 shows a rotation shaft mounting portion in the case where the gear mechanism includes a worm gear. The gear mechanism 52 composed of a worm gear includes a worm 55 mounted on the output shaft 51*a* (see FIG. 1) of the speed reduction mechanism 51, and a worm wheel 56 mounted on the rotation shaft 12 at the revolute pair section between the proximal end side link hub 2 (see FIG. 1) and the proximal side end link member 5. Rotation of the posture control actuator 50 (see FIG. 1) is transmitted via the worm 55 and the worm wheel 56 to the rotation shaft 12, thereby operating the proximal side end link member 5. In this case as well, the same operation and effect as those with the configuration shown in FIG. 5 are achieved.

Examples of an axis-orthogonal type gear used for the gear mechanism 52 include, in addition to the bevel gear shown in FIG. 5 and the worm gear shown in FIG. 12, a hypoid gear, and a screw gear.

Figure 13:
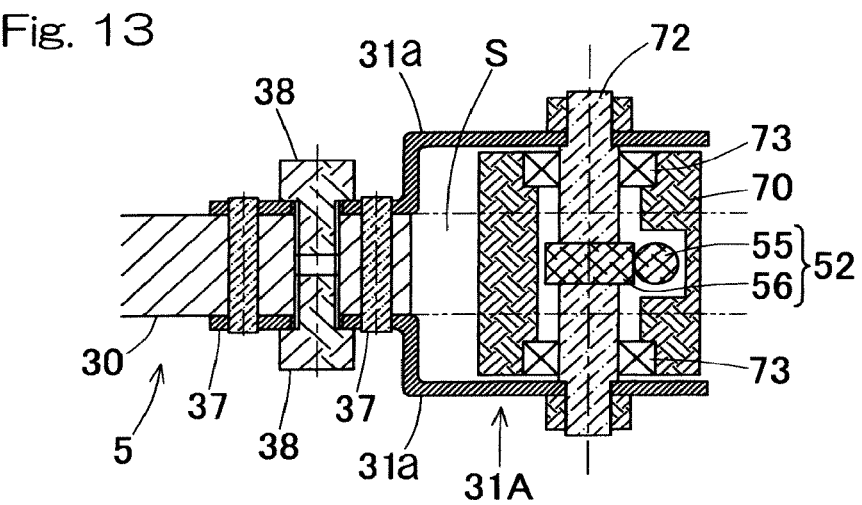
FIG. 13 is a cross-sectional view of a revolute pair section, between a proximal end side link hub and a proximal side end link member, having a still different configuration.

FIG. 13 shows an embodiment in which the configuration of a revolute pair section between a proximal end side link hub and a proximal side end link member is changed from that in the embodiment in FIG. 5. In this embodiment, a gear box 70 in which the gear mechanism 52 is accommodated is provided. The gear box 70 is fixed to the proximal end side link hub (not shown). The gear box 70 corresponds to the rotation support member 11 in the embodiment shown in FIG. 5. Thus, a proximal end member (not shown) and the gear box 70 form the proximal end side link hub.

Figure 14A:
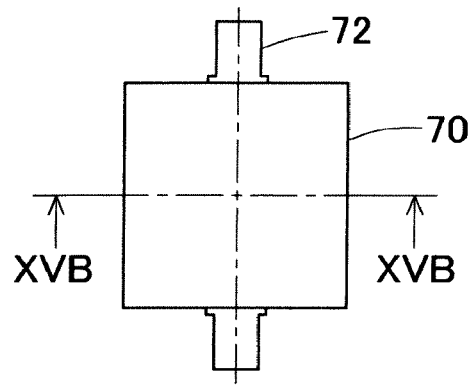
FIG. 14A is a plan view of a gear box.
Figure 14B:
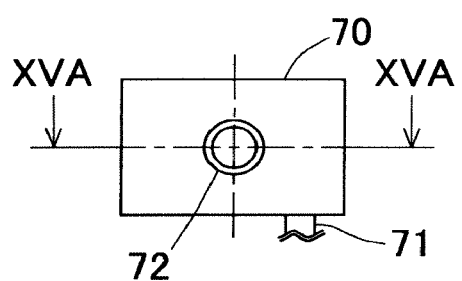
FIG. 14B is a side view of the gear box.

As shown in FIGS. 14A and 14B, a gear box input shaft 71 projects from the bottom surface of the gear box 70, and a gear box output shaft 72 projects from two opposite side surfaces of the gear box 70. The gear box input shaft 71 corresponds to the output shaft 51*a* (see FIG. 1) of the speed reduction mechanism 51 or a shaft coupled to the output shaft 51*a*. The gear box output shaft 72 is a rotation shaft at the revolute pair section between the proximal end side link hub 2 (see FIG. 1), and the proximal side end link member 5 (see FIG. 1) and corresponds to the rotation shaft 12 in the embodiment shown in FIG. 5.

Figure 15A:
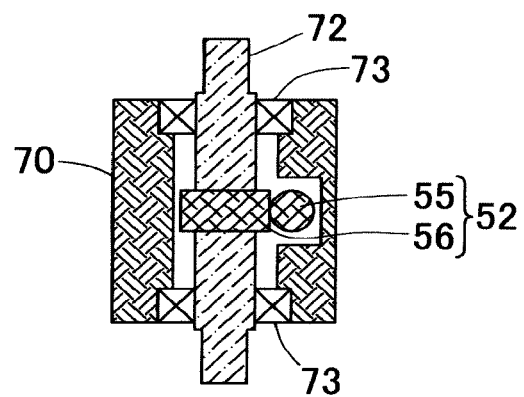
FIG. 15A is a cross-sectional view taken along a line XVA-XVA in FIG. 14B.
Figure 15B:
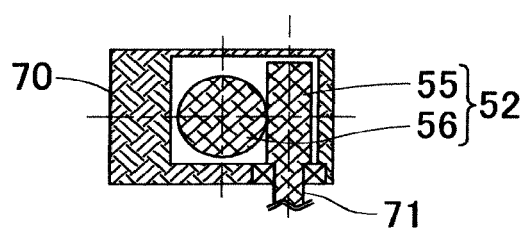
FIG. 15B is a cross-sectional view taken along a line XVB-XVB in FIG. 14A.

As shown in cross-sectional views in FIGS. 15A and 15B, the gear mechanism 52 includes the worm 55 and the worm wheel 56. The worm 55 forming a driving gear is mounted on the gear box input shaft 71, and the worm wheel 56 forming a driven gear is mounted on the gear box output shaft 72. The gear box output shaft 72 is rotatably supported by the gear box 70 via two bearings 73. The worm wheel 56 is located in a space S (FIG. 13) sandwiched between two virtual planes obtained by extending the radially inner edge and the radially outer edge of one end of the bent portion 30 in the longitudinal direction of the rotation shaft mounting portion 31A.

With this configuration, the gear mechanism 52, the rotation shaft or the gear box output shaft 72, and the bearings 73 are disposed together within the gear box 70, and therefore, it is easy to assemble the gear mechanism 52. In addition, when the gear mechanism 52 is disposed within the gear box 70, improvement of safety, prevention of scattering of grease, prevention of entering of foreign matter into the gear mechanism 52 and the like can be achieved.

In the respective embodiments in FIG. 5, FIG. 9, FIG. 10, FIG. 11, FIG. 12 and FIG. 13, the rotation shaft mounting portion 31A of the proximal side end link member 5 includes the two rotation shaft mounting bodies 31*a* (or 31*a*') that are disposed so as to oppose each other and to which the rotation shaft 12 or 72 is mounted, and the bevel gear 54 or the worm wheel 56, forming a part of the gear mechanism 52 (FIG. 1, FIG. 12, FIG. 13), is disposed between these two rotation shaft mounting bodies 31*a*. When the rotation shaft mounting portion 31A includes the two rotation shaft mounting bodies 31*a* (or 31*a*') disposed so as to oppose each other, the rigidity of the rotation shaft mounting portion 31A is high as compared to the case where the rotation shaft mounting portion 31A is composed of one rotation shaft mounting body (not shown).

When it is possible to dispose at least a part of the gear mechanism 52 in the space S sandwiched between the two virtual planes obtained by extending the radially inner edge and the radially outer edge of one end of the bent portion 30 in the longitudinal direction of the rotation shaft mounting portion 31A, and it is possible to ensure higher rigidity of the rotation shaft mounting portion 31A than a desired value, the rotation shaft mounting portion 31A may be composed of one rotation shaft mounting body 31*a*.

Figure 16:
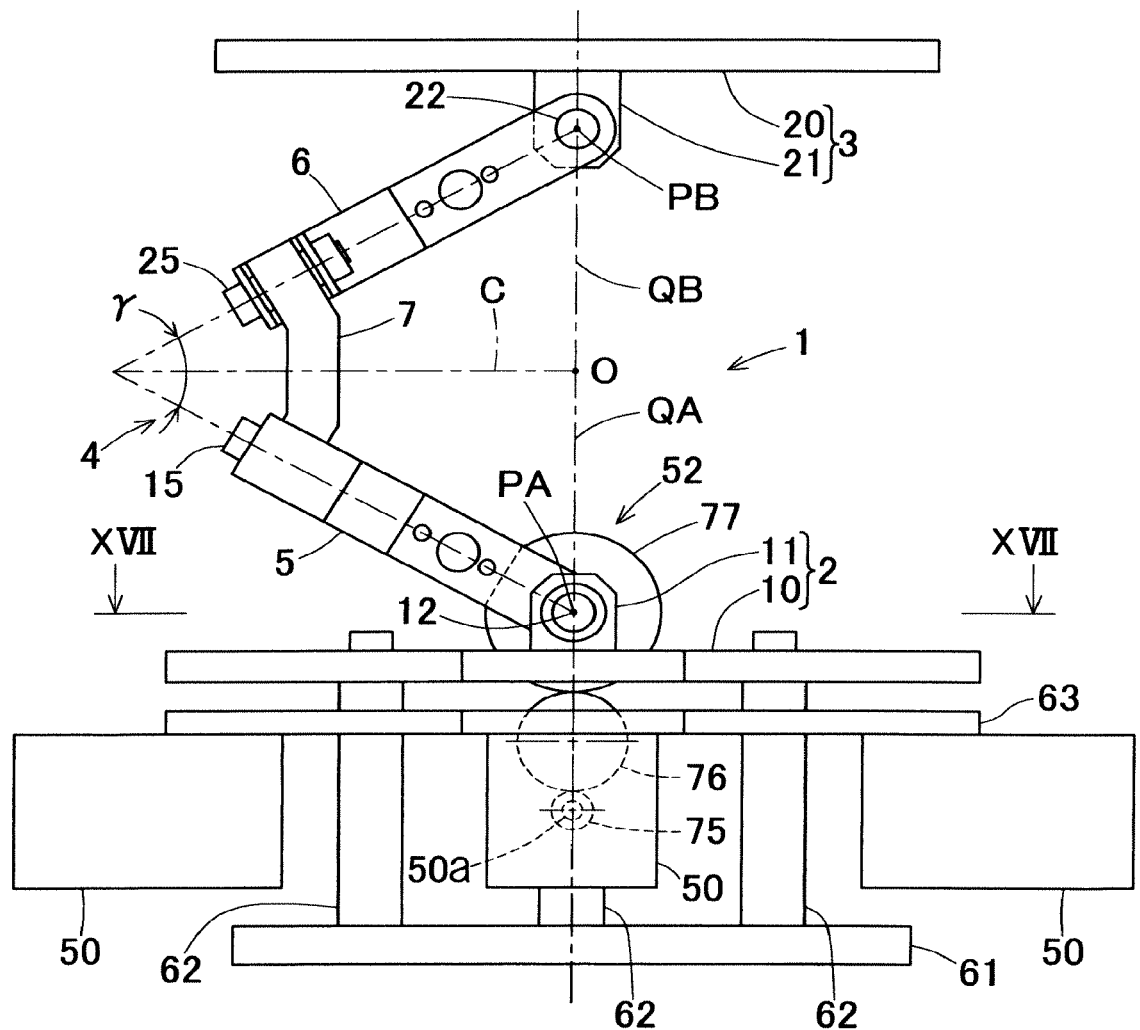
FIG. 16 is a front view of a link actuating device according to another embodiment of the present invention, wherein a part thereof is omitted.
Figure 17:
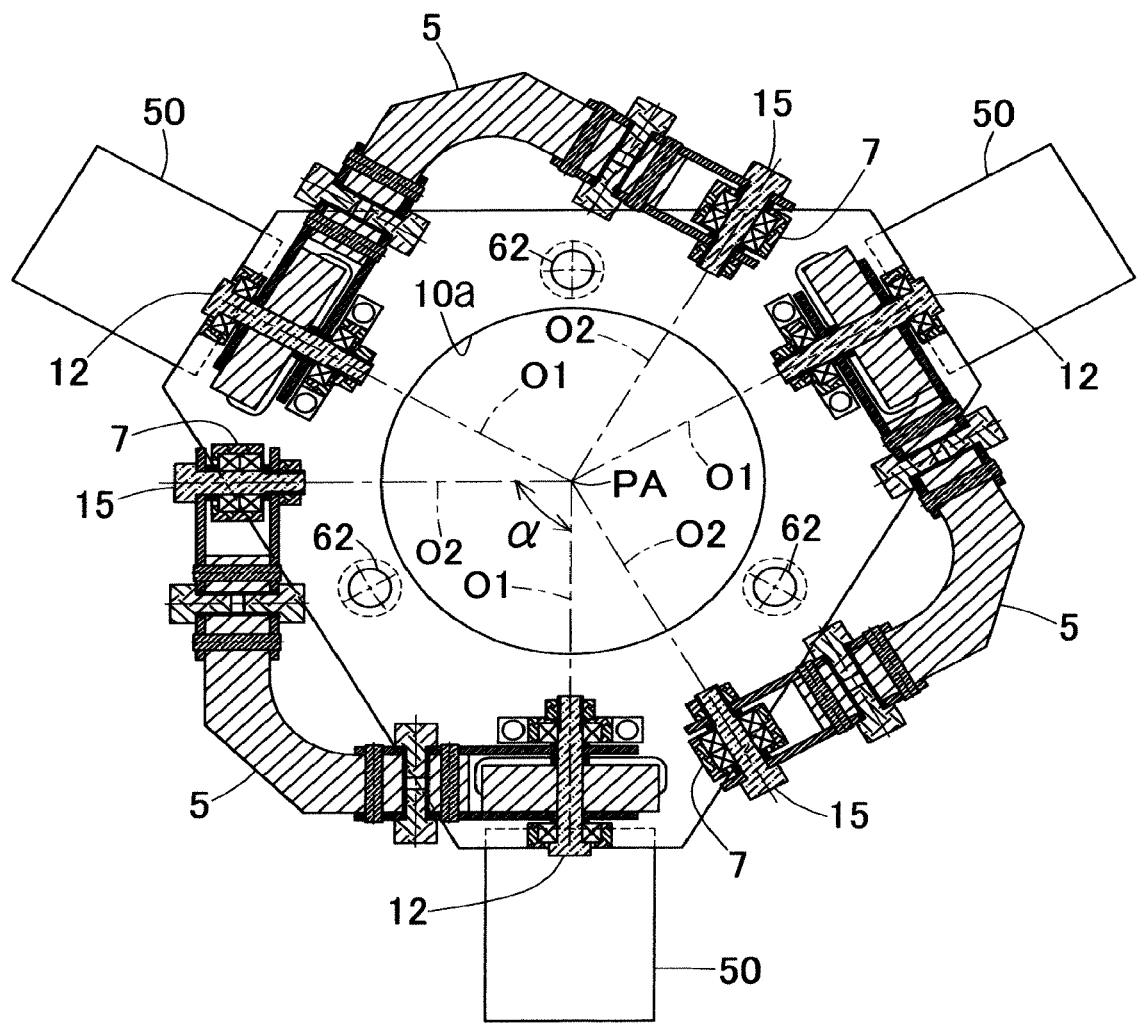
FIG. 17 is a cross-sectional view taken along a line XVII-XVII in FIG. 16.

FIG. 16 is a front view of a link actuating device according to another embodiment of the present invention, wherein a part thereof is omitted. FIG. 17 is a cross-sectional view taken along a line XVII-XVII in FIG. 16. In FIGS. 16-17, parts that are the same as or equivalent to the parts shown in corresponding FIG. 1 and FIG. 4 are designated by the same reference numerals, and some of the reference numerals are omitted for simplification. In the link actuating device shown in FIGS. 16-17, each posture control actuator 50 is mounted on the motor mounting member 63 such that an output shaft 50*a* thereof extends horizontally. Rotation of the horizontal output shaft 50*a* is transmitted via three spur gears 75, 76 and 77 to the rotation shaft 12. These three spur gears 75, 76 and 77 cooperate together to form the gear mechanism 52, and the gear mechanism 52 serves as a speed reduction mechanism.

Since each posture control actuator 50 is not disposed on the same axis as the rotation shaft 12 but is disposed below the rotation shaft 12, a configuration can be achieved in which no component is present around the revolute pair section between the proximal side end link member 5 and the intermediate link member 7. Accordingly, the operating angle of the proximal side end link member 5 can be large, and therefore, the range where the posture of the distal end side link hub 3 relative to the proximal end side link hub 2 can be changed is widened.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . parallel link mechanism
2 . . . proximal end side link hub
3 . . . distal end side link hub
4 . . . link mechanism
5 . . . proximal side end link member
6 . . . distal side end link member
7 . . . intermediate link member
12, 15, 22, 25 . . . rotation shaft
13, 16 . . . bearing
30 . . . bent portion
31A, 31B . . . rotation shaft mounting portion
31$a$ . . . rotation shaft mounting body
50 . . . posture control actuator
52 . . . gear mechanism
53 . . . bevel gear
54 . . . bevel gear (part of gear mechanism)
55 . . . worm (driving gear)
56 . . . worm wheel (driven gear)
70 . . . gear box
71 . . . gear box input shaft
73 . . . bearing
S . . . space

What is claimed is:

1. A link actuating device comprising:
   a proximal end side link hub;
   a distal end side link hub;
   three or more link mechanisms which couples the distal end side link hub with the proximal end side link hub such that a posture of the distal end side link hub can be changed relative to the proximal end side link hub; and
   a posture control actuator configured to arbitrarily change the posture of the distal end side link hub relative to the proximal end side link hub, the posture control actuator being provided to each of two or more link mechanisms of the three or more link mechanisms, wherein
   each of the link mechanisms includes: a proximal side end link member having one end rotatably coupled to the proximal end side link hub; a distal side end link member having one end rotatably coupled to the distal end side link hub; and an intermediate link member having opposite ends rotatably coupled to other ends of the proximal side and distal side end link members, respectively,
   the proximal side end link member has a bent portion and a rotation shaft mounting portion that is fixed to one end of the bent portion and to which a rotation shaft located at an axis of a revolute pair between the proximal end side link hub and the proximal side end link member is mounted, and
   at least a part of a gear mechanism configured to transmit rotary motion by the posture control actuator to the proximal side end link member is mounted on the rotation shaft mounting portion and disposed in a space between two virtual planes obtained by extending a radially inner edge and a radially outer edge of the one end of the bent portion in a longitudinal direction of the rotation shaft mounting portion.

2. The link actuating device as claimed in claim 1, wherein the rotation shaft mounting portion includes two rotation shaft mounting bodies that are disposed so as to oppose each other and to which the rotation shaft is mounted, and the at least a part of the gear mechanism is disposed between these two rotation shaft mounting bodies.

3. The link actuating device as claimed in claim 2, wherein each of the rotation shaft mounting bodies is composed of a plate-shaped member detachably mounted on the bent portion.

4. The link actuating device as claimed in claim 3, wherein both or one of the two rotation shaft mounting bodies is formed in a bent shape such that an interval between the two rotation shaft mounting bodies at a location where the rotation shaft is mounted to the two rotation shaft mounting bodies is larger than that at a location where the two rotation shaft mounting bodies are fixed to the bent portion.

5. The link actuating device as claimed in claim 2, wherein bearings that rotatably support both ends of the rotation shaft are disposed at an outer side in a direction in which the two rotation shaft mounting bodies are aligned.

6. The link actuating device as claimed in claim 1, wherein the gear mechanism comprises a speed reduction mechanism configured to transmit the rotary motion by the posture control actuator to the proximal side end link member while reducing a speed of the rotary motion.

7. The link actuating device as claimed in claim 1, further comprising a gear box that accommodates the gear mechanism, wherein
   the gear box is fixed to the proximal end side link hub,
   the rotation shaft is rotatably supported by the gear box via a bearing,
   a driving gear of the gear mechanism is mounted on an input shaft of the gear box coupled to the posture control actuator, and
   a driven gear of the gear mechanism is mounted on the rotation shaft.

* * * * *